(12) United States Patent
Sato et al.

(10) Patent No.: US 7,357,431 B2
(45) Date of Patent: Apr. 15, 2008

(54) STRUCTURE FOR MOUNTING ULTRASONIC SENSOR ON MOUNTING MEMBER

(75) Inventors: Yoshihisa Sato, Nagoya (JP); Yasuhiro Kawashima, Okazaki (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/404,839

(22) Filed: Apr. 17, 2006

(65) Prior Publication Data

US 2006/0232081 A1    Oct. 19, 2006

(30) Foreign Application Priority Data

Apr. 15, 2005  (JP) .............................. 2005-118718

(51) Int. Cl.
*B00R 19/48* (2006.01)
(52) U.S. Cl. ..................................................... 293/117
(58) Field of Classification Search ................. 293/117
See application file for complete search history.

(56) References Cited

U.S. PATENT DOCUMENTS

| | | | | |
|---|---|---|---|---|
| 6,085,592 | A * | 7/2000 | Kawashima | 73/632 |
| 6,089,106 | A * | 7/2000 | Patel et al. | 73/862.582 |
| 6,318,774 | B1 * | 11/2001 | Karr et al. | 293/117 |
| 6,340,187 | B1 * | 1/2002 | Villiere et al. | 293/117 |
| 6,759,950 | B2 * | 7/2004 | Nishimoto et al. | 340/436 |
| 2005/0242933 | A1 * | 11/2005 | Loh | 340/435 |
| 2007/0062292 | A1 * | 3/2007 | Sato et al. | 73/649 |

FOREIGN PATENT DOCUMENTS

| | | |
|---|---|---|
| DE | 197 58 075 A1 | 2/1999 |
| DE | 199 24 505 B4 | 11/2000 |
| JP | 3032997 | 10/1996 |
| JP | 11271423 A * | 10/1999 |
| JP | 2001-63497 | 3/2001 |
| JP | 2001063497 A * | 3/2001 |
| JP | 2003255043 A * | 9/2003 |
| JP | 2003315443 A * | 11/2003 |
| JP | 2004-251665 | 9/2004 |
| JP | 2004251665 A * | 9/2004 |
| JP | 2005130040 A * | 5/2005 |
| JP | 2006337028 A * | 12/2006 |

OTHER PUBLICATIONS

German Office Action issued in Official File No. 10 2006 017 055.5-35 on Jun. 20, 2007, together with an English translation.

* cited by examiner

*Primary Examiner*—Kiran B. Patel
(74) *Attorney, Agent, or Firm*—Nixon & Vanderhye PC (57) ABSTRACT

An ultrasonic sensor for emitting ultrasonic waves and for receiving the waves reflected from objects is mounted on a mounting member such as a bumper of an automotive vehicle. A through-hole for inserting a front portion of the ultrasonic sensor is formed in the bumper. The ultrasonic sensor is connected to an inner surface of the bumper using a fixing member so that a vibrating front surface of the ultrasonic sensor is exposed to the front side of the bumper. A front periphery of the through-hole which is rough due to machining burrs or the like is covered with a masking member formed separately from the mounting member. Thus, the ultrasonic sensor is easily mounted on a bumper without damaging its ornamental design.

17 Claims, 6 Drawing Sheets

STRUCTURE FOR MOUNTING ULTRASONIC SENSOR ON MOUNTING MEMBER

CROSS-REFERENCE TO RELATED APPLICATION

This application is based upon and claims benefit of priority of Japanese Patent Application No. 2005-118718 filed on Apr. 15, 2005, the content of which is incorporated herein by reference.

BACKGROUND OF THE INVENTION

1. Field of the Invention

The present invention relates to a structure for mounting an ultrasonic sensor on a mounting structure such as a bumper of an automotive vehicle.

2. Description of Related Art

A first example of a structure for mounting an ultrasonic sensor on a bumper of an automotive vehicle is disclosed in JP-A-2001-63497. In this example, an ultrasonic sensor is inserted into a through-hole formed in a bumper and fixed to the bumper by a holder having a flange contacting a front surface of the bumper. A second example is shown in JP-A-2001-527480. In this example, an ultrasonic sensor inserted into a through-hole is connected to the bumper by a holder connected to an inner surface of the bumper.

In the first example, the flange of the holder contacting the front surface of the bumper is not fixed to the bumper, and the ultrasonic sensor is connected to the bumper by a force of a member such as a leaf spring that pulls the ultrasonic sensor toward the rear side of the bumper. Because of this structure, an area of the flange contacting the front surface of the bumper has to be relatively large and the flange has to be thick. In the second example, the holder has no flange contacting the front surface of the bumper. Therefore, there is an ornamental problem that inner wall of the through-hole may be visible from the front side of the bumper.

SUMMARY OF THE INVENTION

The present invention has been made in view of the above-mentioned problems, and an object of the present invention is to provide an improved structure for mounting an ultrasonic sensor on a mounting member, in which the ultrasonic sensor is firmly connected to the mounting member while providing a good ornamental design.

An ultrasonic sensor for emitting ultrasonic waves and for receiving the waves reflected from objects is mounted on a mounting member such as a bumper of an automotive vehicle. The structure for mounting the ultrasonic sensor includes a through-hole formed in a mounting member such as a bumper of an automotive vehicle, a fixing member for connecting the ultrasonic sensor to an inner surface of the mounting member, and a masking member having an outer portion for covering a front periphery of the through-hole on an outer surface of the mounting member and a cylindrical portion for covering an inner wall of the through-hole.

The present invention is advantageous especially when the through-hole is formed after the bumper (as the mounting member) is painted. The inner wall of the through-hole becomes rough and some burrs become visible from the front side of the bumper because the through-hole is formed by a hole saw or the like. The ultrasonic sensor is connected to the mounting member (bumper) by inserting a front portion of the ultrasonic sensor into the through-hole and by fixing the ultrasonic sensor to the inner surface of the mounting member with the fixing member. The front periphery of the through-hole on the outer surface and the inner wall of the through are covered with the masking member. Thus, an ornamental design of the mounting member is improved.

Since the masking member is solely used for covering the through-hole, its mechanical strength is not required. Therefore, the masking member can be made small and thin. The front portion of the ultrasonic sensor may be covered with a cylindrical resilient member to provide a cushion between the masking member and the front portion of the ultrasonic sensor. The surface of the cylindrical portion of the masking member contacting the inner wall of the through-hole may be made rough, or a wedge-shaped projection may be formed thereon, to provide a frictional force between the masking member and the inner wall. An inner portion for covering the inner periphery of the through-hole may be added to the masking member. In this case, the masking member is connected to the mounting member by holding the mounting member between the outer portion and the inner portion of the masking member. The masking member may be connected to the mounting member with adhesive.

According to the present invention, the ultrasonic sensor is easily mounted on the mounting member such as an automotive bumper without damaging the ornamental design of the mounting structure. Other objects and features of the present invention will become more readily apparent from a better understanding of the preferred embodiments described below with reference to the following drawings.

DETAILED DESCRIPTION OF THE PREFERRED EMBODIMENTS

Figure 1:
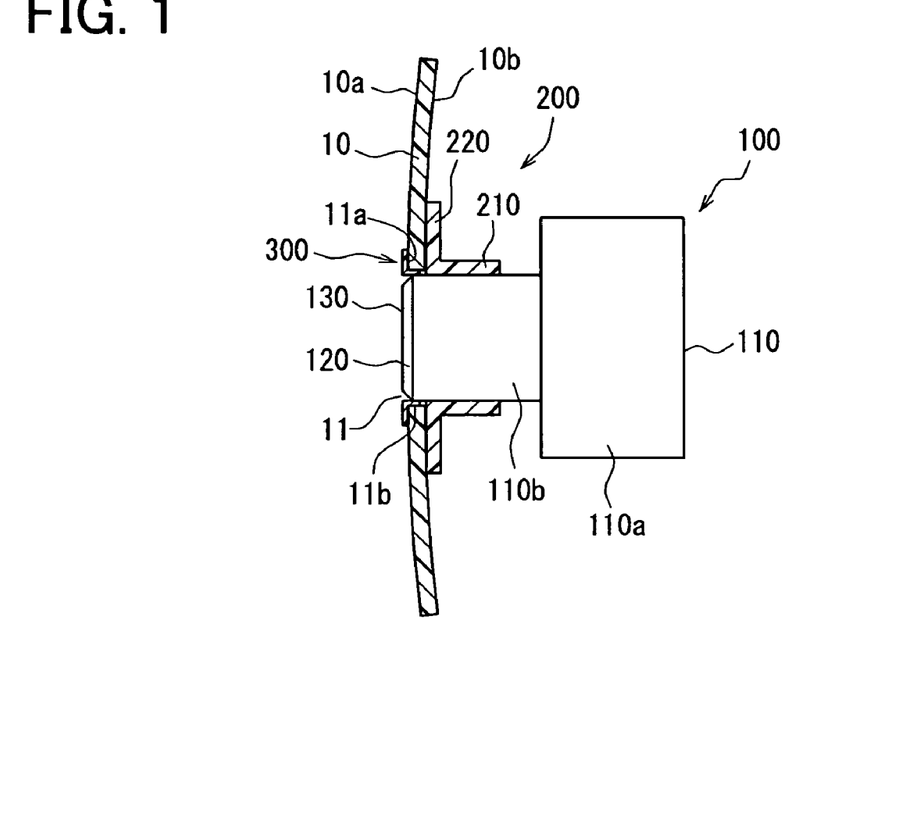
FIG. 1 is a cross-sectional view showing a structure for mounting an ultrasonic sensor on a mounting structure such as a bumper of an automobile vehicle, as a first embodiment of the present invention.

A first embodiment of the present invention will be described with reference to FIGS. 1-3. An ultrasonic sensor 100 is mounted on a bumper of an automotive vehicle in this embodiment. The ultrasonic sensor 100 may be mounted on a front bumper or a rear bumper for serving as a corner sonar or a back sonar. The bumper serves as a mounting member 10 on which the ultrasonic sensor 100 is mounted.

The mounting member 10 is made of synthetic resin such as urethane resin. A through-hole 11 is formed in the mounting member 10, and ultrasonic sensor 100 is inserted into the through-hole 11 and fixed to the mounting member 10 by a fixing member 200, so that a vibrating front surface 130 of the ultrasonic sensor is exposed to a front side of the mounting member 10. A front periphery 11a of the through-hole 11 is covered with a masking member 300. The ultrasonic sensor 100 includes a vibrator for transmitting ultrasonic waves toward obstacles in front of a vehicle (or toward a back side of a vehicle) and for receiving the waves reflected by the obstacles. The ultrasonic sensor 100 is contained in a casing 110 made of PBT (polybutylene terephthalate).

The casing 110 is composed of a rear portion 110a and a front portion 110b formed in a substantially cylindrical shape. An electronic circuit board for processing signals is contained in the rear portion 110a, and an ultrasonic vibrator, a side surface of which is covered with a cylindrical resilient member 120 (made of a resilient member such as silicone rubber) is disposed in the front portion 110b. A vibrating front surface 130, to a rear surface of which a piezoelectric element is attached, is exposed to the front side of the mounting member 10. The vibrating front surface 130 is colored with the same color as the outer surface 10a of the mounting member 10 to enhance an ornamental effect. The cylindrical resilient member 120 is partially exposed to the front side in this embodiment. The diameter of the front portion 110b is made a little smaller than the diameter of the through-hole 11, and part of the masking member 300 is inserted into the small space between the front portion 110b and the through-hole 11. The vibrating front surface 130 is positioned flush with the outer surface of the mounting member 10.

The fixing member 200 is composed of a cylindrical portion 210 and a flat portion 220. The fixing member 200 may be made of various materials including a resin or a metal. In this particular embodiment, the fixing member 200 is made of PBT (the same material as that of the casing 110). The front portion 110b is coupled to the cylindrical portion 210 by making engagement between a groove (not shown) formed on an inner surface of the cylindrical portion 210 and a projection (not shown) formed around the front portion 110b. The flat portion 220 is connected to the inner surface 10b of the mounting member 10 with adhesive, for example, so that the vibrating front surface 130 of the ultrasonic sensor 100 becomes flush with the outer surface of the mounting member 10.

Figure 2A:
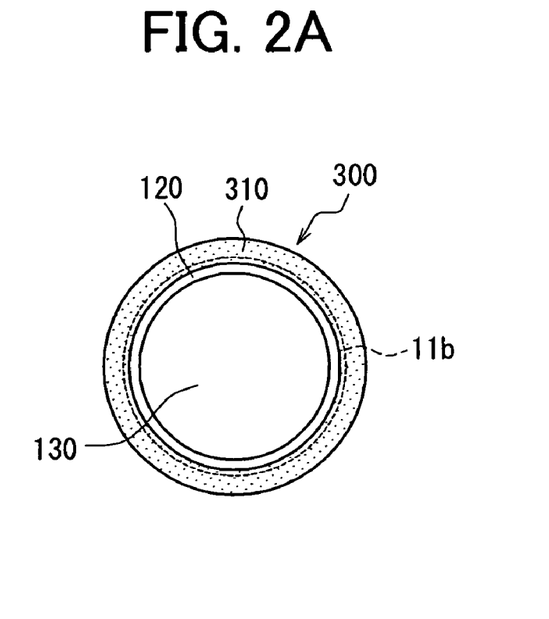
FIG. 2A is a plan view showing a masking member used in the mounting structure shown in FIG. 1, viewed from a front side of the mounting member.
Figure 2B:
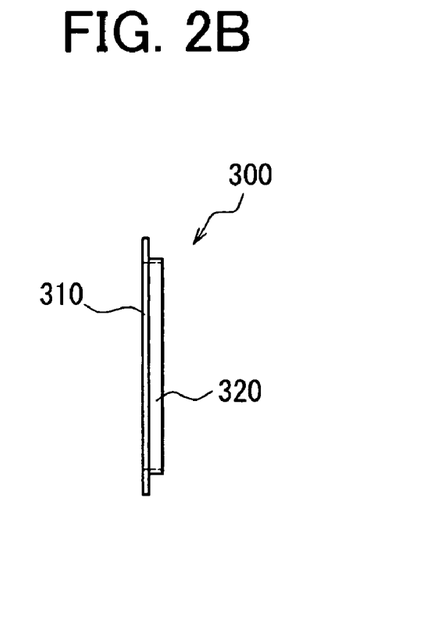
FIG. 2B is a side view showing the masking member shown in FIG. 2A.

Referring to FIGS. 2A and 2B, the masking member 300 will be described. The masking member 300 is composed of an outer portion 310 for covering a front periphery 11a (refer to FIG. 1) of the through-hole 11 and a cylindrical portion 320 for covering at least part of an inner wall 11b (refer to FIG. 1) of the through-hole 11. The masking member 300 may be made of various materials such as resin, metal or rubber. In this particular embodiment, the masking member 300 is made of PBT (the same material as that of the casing 110 and the fixing member 200) by molding.

The masking member 300 is a member only for covering the outer periphery 11a and the inner wall 11b, not for connecting components. Therefore, a high mechanical strength and a large size are not required. A width of the outer portion 310 (a width of a ring portion outside the cylindrical portion 320) may be made in a range of 1-3 mm, and a length of the cylindrical portion 320 maybe less than 1.0 mm. In this particular embodiment, the width of the outer portion 310 is 2 mm, and the length of the cylindrical portion 320 is 0.7 mm.

Figure 3:
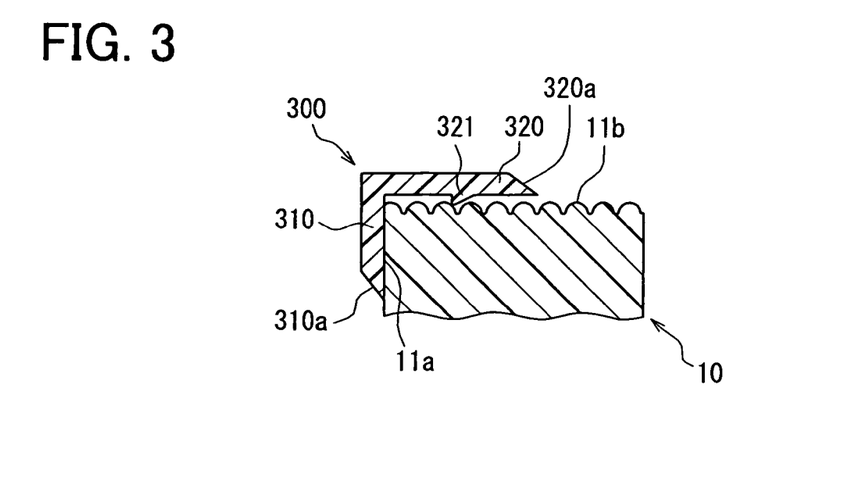
FIG. 3 is a cross-sectional view partially showing, in an enlarge scale, a through-hole of amounting member and a masking member used in the mounting structure shown in FIG. 1.

As shown in FIG. 3, the masking member 300 is disposed to cover the front periphery 11a of the through-hole 11 and the inner wall 11b of the through-hole 11. When the through-hole 11 is formed in the bumper 10 after it is painted, the through-hole 11 is usually formed with a hole saw or the like. Accordingly, the inner wall 11b has a rough surface which is advantageous to firmly hold the masking member 300 between the inner wall 11b and the front portion 110b of the casing 110. Preferably, an inner surface of the cylindrical portion 320 contacting the inner wall 11b is processed to be rough. Alternatively, a wedge-shaped projection 321 is formed on the surface of the cylindrical portion 320, as shown in FIG. 3, so that the wedge-shaped projection 321 engages with the rough surface of the inner wall 11b. In this manner, the masking member 300 is firmly held not to be pulled out toward the front side of the mounting member 10. As shown in FIG. 3, an end portion 310a of the outer portion 310 is tapered to enhance an ornamental effect, and an end portion 320a is tapered so that the front portion 110b of the ultrasonic sensor 100 is easily inserted into the through-hole 11.

The ultrasonic sensor 100 is mounted on the mounting member 10 in the following manner, for example. The through-hole 11 is formed in the mounting member 10 (a bumper) by a hole saw or the like. The masking member 300 is fixed to its position to cover the front periphery 11a of the through-hole 11 and the inner wall 11b of the through-hole 11. Then, the flat portion 220 of the fixing member 200 is connected to the inner surface 10b of the mounting member 10 with adhesive. This order of fixing the masking member 300 and the fixing member 200 may be reversed. Then, the front portion 110b of the ultrasonic sensor 100 is inserted into the cylindrical portion 210 of the fixing member 200. The front portion 110b of the ultrasonic sensor 100 is automatically coupled to the cylindrical portion 210 because the groove formed on the cylindrical portion 210 engages with the projection formed on the front portion 110b. The vibrating front surface 130 of the ultrasonic sensor 100 automatically becomes flush with the outer surface 10a of the mounting member 10. Thus, the ultrasonic sensor 100 is mounted on the mounting member 10.

Following advantages are attained in the first embodiment described above. The masking member 300 for covering the front periphery 11*a* of the through-hole 11 is formed separately from the fixing member 200. Therefore, the masking member 300 can be made much smaller and thinner than a flange portion of a conventional fixing member. Since the front periphery 11*a* of the through-hole 11 (that may be rough because of machining burrs) is covered with the masking member 300, the front view of the mounting member is much improved ornamentally. Further, the rough inner wall 11*b* is covered with the cylindrical portion 320 of the masking member 300. Therefore, ornamental design is further improved.

As shown in FIG. 3, the surface of the cylindrical portion 320 contacting the inner wall 11*b* includes a wedge-shaped projection 321. The wedge-shaped projection 321 engages with the rough inner wall 11*b* to thereby fixedly connect the masking member 300 to the through-hole 11. The wedge-shaped projection 321 may be formed integrally with the masking member 300 when the masking member is formed in a die.

Figure 4:
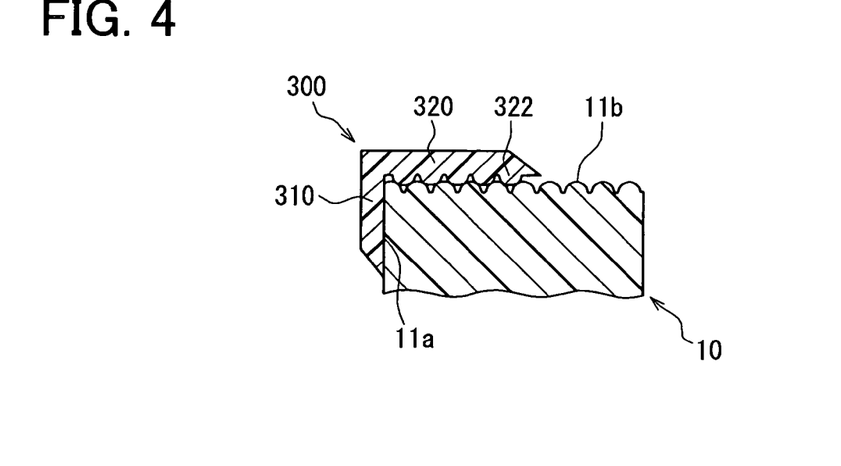
FIG. 4 is a cross-sectional view partially showing a modified form of the structure shown in FIG. 3.
Figure 5:
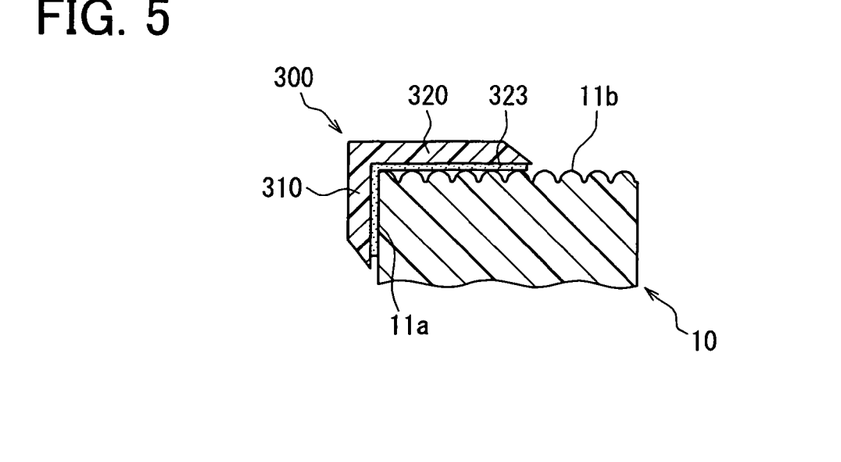
FIG. 5 is a cross-sectional view partially showing another modified form of the structure shown in FIG. 3.

As shown in FIG. 4, the surface of the cylindrical portion 320 may be processed to have a rough surface 322 that contacts the inner wall 11*b* of the through-hole 11. The masking member 300 can be firmly connected to the inner wall 11*b* of the through-hole 11 in this manner, too. Alternatively, as shown in FIG. 5, the masking member 300 may be connected to the mounting member 10 with an adhesive film 323. It is also possible to connect only the outer portion 310 to the outer surface 10*a*, without making contact between the cylindrical portion 320 and the inner wall 11*b*.

Figure 7A:
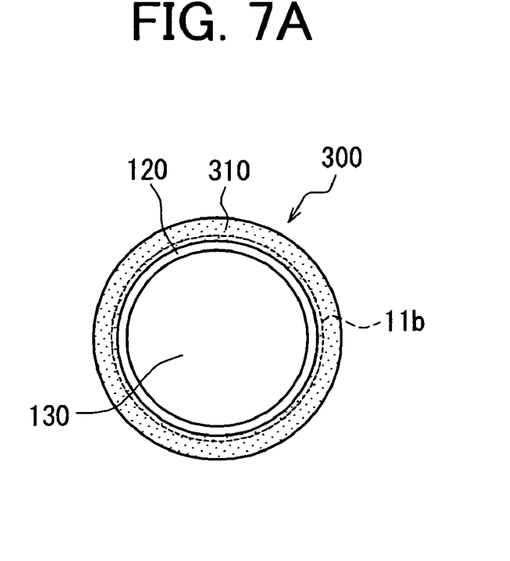
FIG. 7A is a plan view showing a masking member used in the mounting structure shown in FIG. 6, viewed from a front side of the mounting member.
Figure 7B:
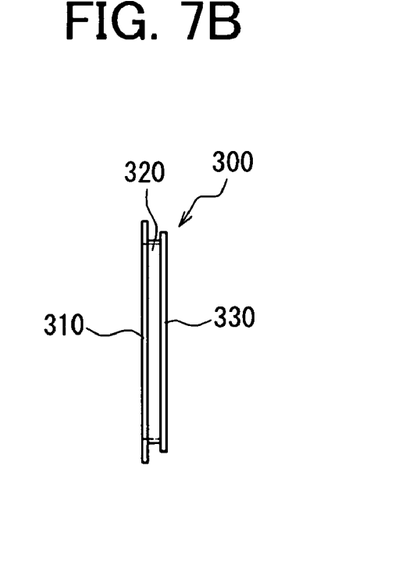
FIG. 7B is a side view showing the masking member shown in FIG. 7A.
Figure 8:
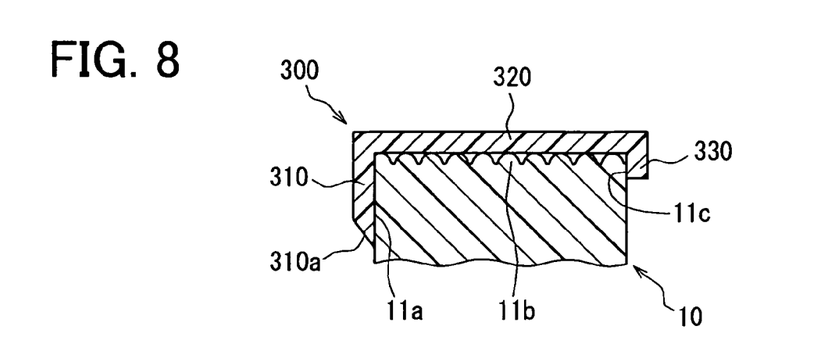
FIG. 8 is a cross-sectional view partially showing, in an enlarged scale, a through-hole and a masking member used in the mounting structure shown in FIG. 6.

A second embodiment of the present invention will be described with reference to FIGS. 6-8. In this embodiment, the masking member 300 is modified to include an inner portion 330. Other structures are the same as those of the first embodiment. The masking member 300 is made of a resilient rubber material in this embodiment. As better seen in FIG. 8, the masking member 300 is composed of an outer portion 310 covering the front periphery 11*a* of the through-hole 11, a cylindrical portion 320 contacting the inner wall 11*b* of the through-hole 11 and an inner portion 330 covering a rear periphery 11*c* of the through-hole 11. The masking member 300 is firmly connected to the inner wall 11*b* by gripping the mounting member 10 with both of the outer portion 310 and the inner portion 330.

Figure 6:
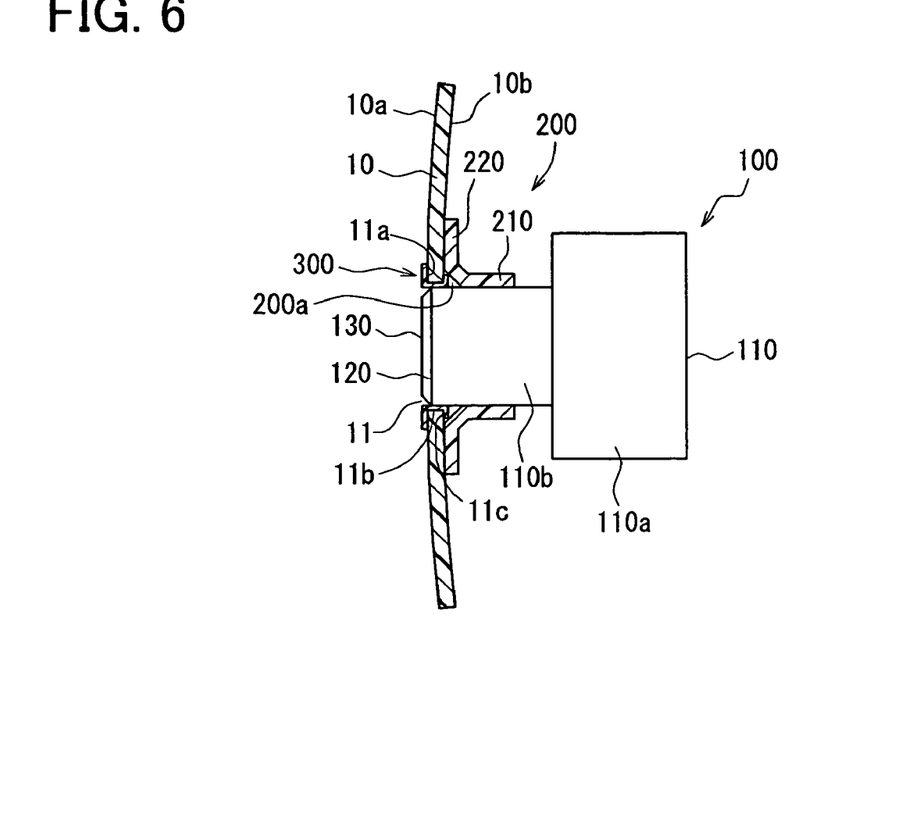
FIG. 6 is a cross-sectional view showing a structure for mounting an ultrasonic sensor on a mounting member as a second embodiment of the present invention.
Figure 9:
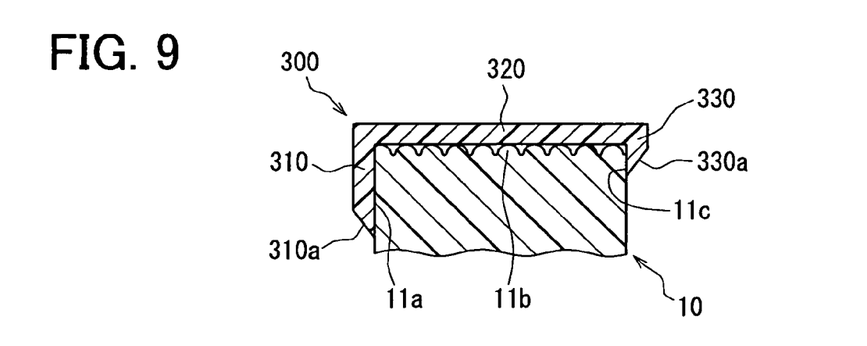
FIG. 9 is a cross-sectional view partially showing a modified form of the structure shown in FIG. 8.

As shown in FIG. 6, the bent portion of the fixing member 200 is formed to leave a space 200*a* for accommodating the inner portion 330 of the masking member 300 therein to avoid interference between the inner portion 330 and the fixing member 200. The masking member 300 may be made of a material other than a rubber material. For example, it may be made of a metal or a resin, forming slits in the inner portion 330 so that the inner portion 330 can be bent inward after the masking member 330 is inserted into the through-hole 11. As shown in FIG. 9, an end portion 330*a* of the inner portion 330 may be tapered.

Figure 10:
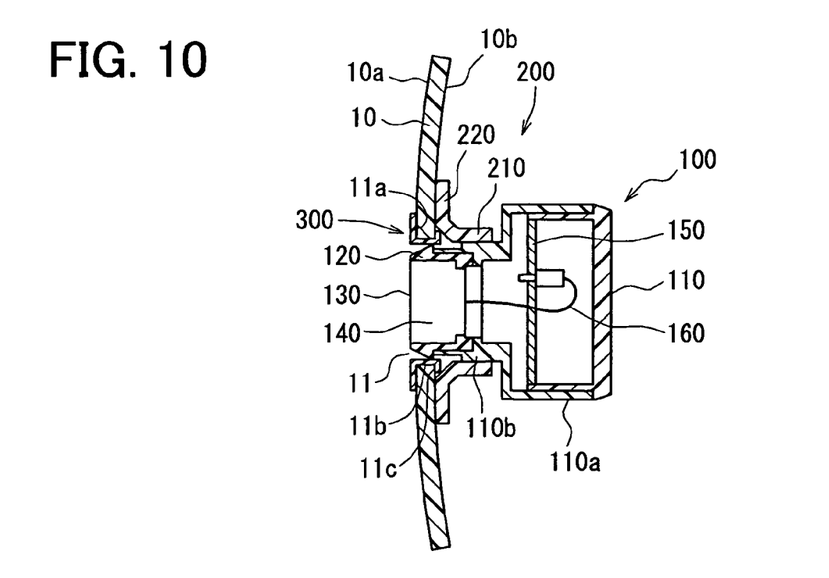
FIG. 10 is a cross-sectional view showing a structure for mounting an ultrasonic sensor on a mounting member, as a third embodiment of the present invention.

Referring to FIG. 10, a third embodiment of the present invention will be described. In this embodiment, the shape of the cylindrical resilient member 120 is modified. An ultrasonic vibrator 140 connected to a circuit board 150 with a lead wire 160 is shown in FIG. 10. As shown in FIG. 10, a front portion of the cylindrical resilient member covering the ultrasonic vibrator 140 of the ultrasonic sensor 100 is formed in a tapered shape.

Since the tapered front portion of the resilient cylindrical member gradually becomes larger as it proceeds inward, the ultrasonic sensor 100 covered with the cylindrical resilient member 120 is easily inserted into the inner wall 11*b* of the through-hole 11 from the rear side of the mounting member 10. Further, the tapered portion of the resilient member 120 is interposed between the masking member 300 and the ultrasonic vibrator 140 of the ultrasonic sensor 100, an excessive force is not applied to the masking member 300.

Figure 11:
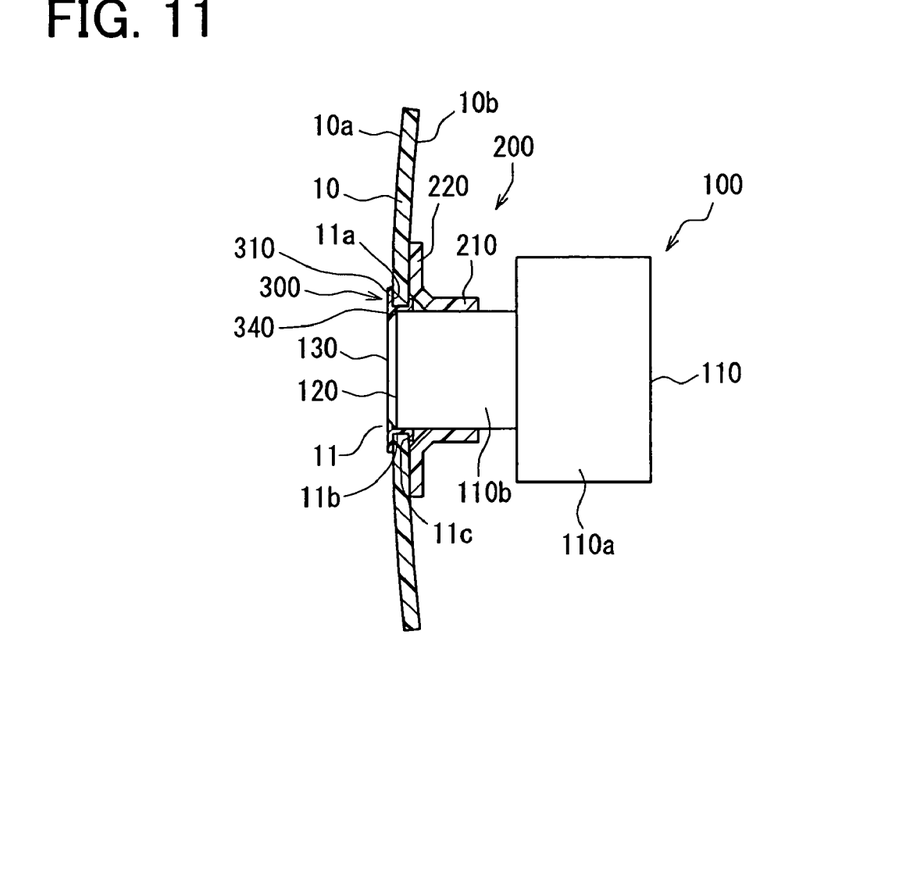
FIG. 11 is a cross-sectional view showing a structure for mounting an ultrasonic sensor on a mounting structure, as a fourth embodiment of the present invention.
Figure 12A:
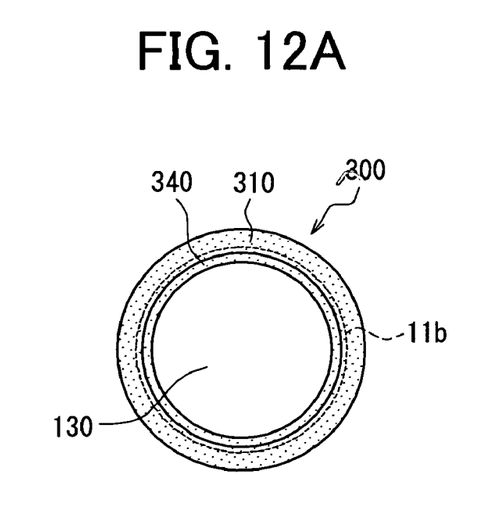
FIG. 12A is a plan view showing a masking member used in the mounting structure shown in FIG. 11, viewed from a front side of the mounting member.
Figure 12B:
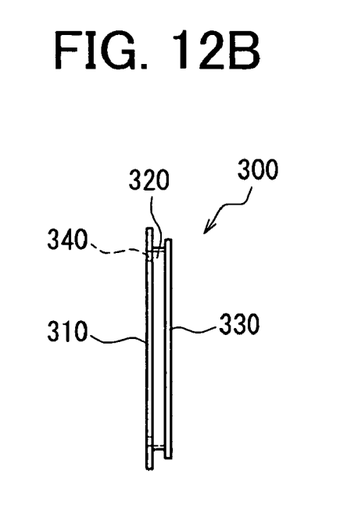
FIG. 12B is a side view showing the masking member shown in FIG. 12A.

Referring to FIGS. 11, 12A and 12B, a fourth embodiment of the present invention will be described. In this embodiment, a corner portion 340 for covering a front corner portion inside the front periphery 11*a* is added to the masking member 300, as shown in FIG. 11. That is, the masking member 300 includes the corner portion 340 in addition to the outer portion 310, the cylindrical portion 320 and the inner portion 330, as shown in FIGS. 12A and 12B. Other structures are the same as those of the foregoing embodiments described above. The masking member 300 is connected to the mounting member 10 by gripping the mounting member 10 with the outer portion 310 and the inner portion 330.

Figure 13:
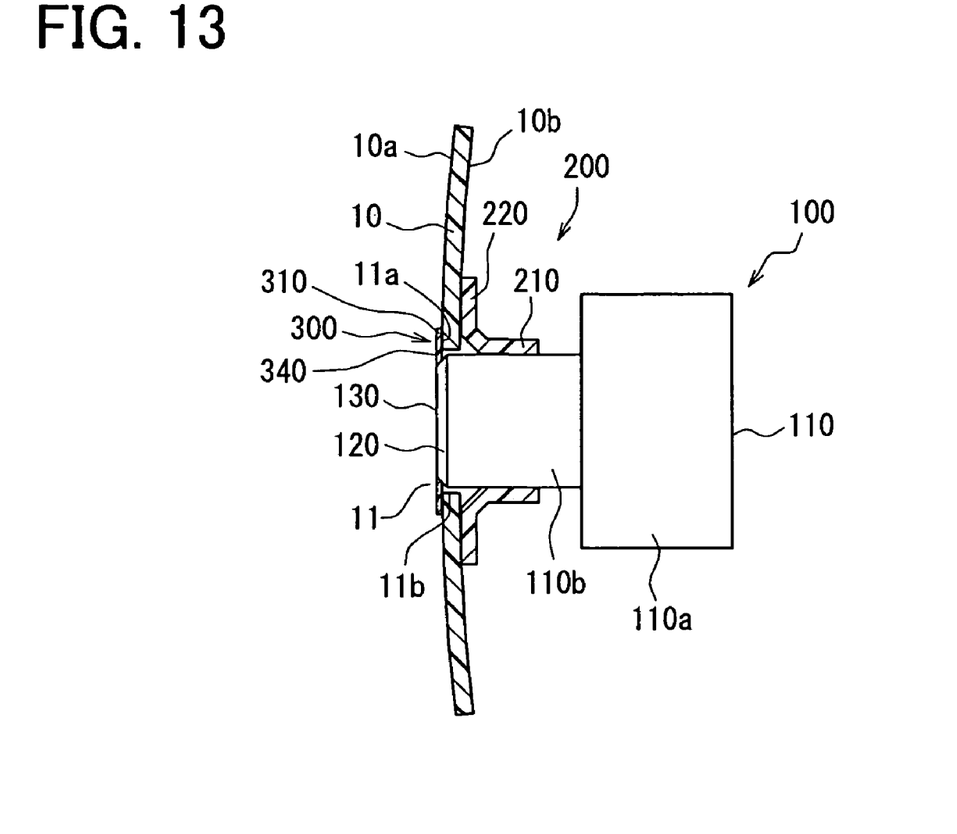
FIG. 13 is a cross-sectional view showing a modified form of the mounting structure shown in FIG. 11.

The fourth embodiment may be modified to a form shown in FIG. 13. That is, the cylindrical portion 320 and the inner portion 330 of the masking member 300 are eliminated, leaving only the outer portion 310 and the corner portion 340. The masking member 300 is connected to the outer surface 10*a* of the mounting member 10 with adhesive, for example. The inner wall 11*b* of the through-hole 11 can be covered to enhance an ornamental design in this manner, too.

The present invention is not limited to the embodiments described above, but it may be variously modified. For example, the ultrasonic sensor 100 maybe mounted on amounting member other than the bumper of an automobile. Though the vibrating front surface 130 of the ultrasonic sensor 100 is positioned to be flush with the front surface of the outer portion 310 of the masking member 300, it may be positioned differently as long as the vibrating front surface 130 is exposed to the front side of the mounting member 10.

Figure 14:
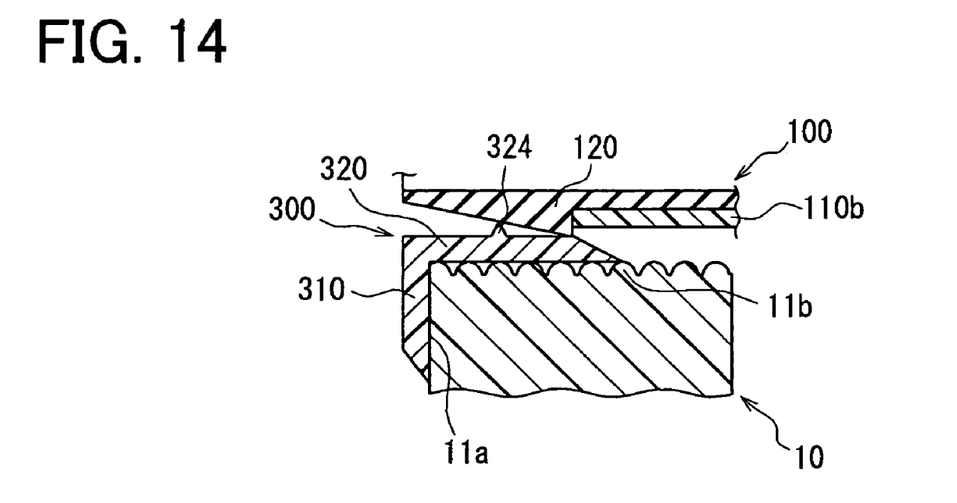
FIG. 14 is a cross-sectional view partially showing, in an enlarged scale, a modified form of the mounting structures shown above.

Though the ultrasonic sensor 100 is formed to be mounted from the inside of the mounting member 10 in the foregoing embodiments, it is also possible to form the ultrasonic sensor 100 to be mounted from the outside. The masking member 300 may be formed by methods other than resin molding. It is also possible to form the outer portion 310 separately from the cylindrical portion 320. The masking member 300 may be modified to a form shown in FIG. 14. A fixing projection 324 contacting the cylindrical resilient member 120 may be formed on the cylindrical portion 320 of the masking member 300. The masking member 300 can be positioned by biting in the cylindrical resilient member 120. Though the masking member 300 is colored with the same color as the outer surface 10*a* of the mounting member and the vibrating front surface 130 of the ultrasonic sensor 100 in the foregoing embodiments, the color of the masking member 300 is not limited to the same color.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A structure for mounting an ultrasonic sensor on a mounting member having an outer surface and an inner surface, comprising:

a through-hole formed in the mounting member, the through-hole having an inner wall, a front periphery on the outer surface and a rear periphery on the inner surface;

a fixing member for fixing the ultrasonic sensor on the inner surface of the mounting member, so that a vibrating front surface of the ultrasonic sensor exposes to a front side of the outer surface of the mounting member; and a masking member for covering at least the front periphery of the through-hole, while leaving the vibrating front surface of the ultrasonic sensor exposed to the front side of the outer surface of the mounting member, wherein:

the masking member further covers at least part of the inner wall of the through-hole, and wherein:

the masking member includes an outer portion covering the front periphery of the through-hole and a cylindrical portion covering the inner wall of the through-hole.

2. The mounting structure as in claim 1, wherein:
the through-hole is formed after the mounting member is painted.

3. The mounting structure as in claim 1, wherein:
a surface of the cylindrical portion contacting the inner wall is a rough surface.

4. The mounting structure as in claim 1, wherein:
the inner wall of the through-hole has a rough surface, and a projection engaging with the rough surface of the inner wall is made on the cylindrical portion of the masking member.

5. The mounting structure as in claim 3, wherein:
the surface of the cylindrical portion contacting the inner wall is processed to be rough.

6. The mounting structure as in claim 1, wherein:
the masking member further includes an inner portion, resiliently connected to the cylindrical portion, for covering the rear periphery of the through-hole, and the masking member is connected to the mounting member by holding the mounting member between the outer portion and the inner portion.

7. The mounting structure as in claim 6, wherein:
the fixing member is connected to the inner surface of the mounting member to make a small space for accommodating the inner portion of the masking member therein.

8. The mounting structure as in claim 1, wherein:
the ultrasonic sensor includes a cylindrical front portion covered with a cylindrical resilient member;

the cylindrical front portion covered with the cylindrical resilient member is inserted into the through-hole of the mounting member from a rear side of the mounting member; and a front portion of the cylindrical resilient member positioned in the inner wall of the through-hole covered with the cylindrical portion of the masking member is a tapered portion having the smallest diameter at its front most position.

9. The mounting structure as in claim 8, wherein:
an inner diameter of the cylindrical portion of the masking member is smaller than the largest diameter of the tapered portion of the cylindrical resilient member.

10. The mounting structure as in claim 8, wherein:
the masking member includes a projection contacting the cylindrical resilient member for fixing the masking member to the cylindrical resilient member.

11. The mounting structure as in claim 1, wherein:
the masking member is connected to the mounting member with an adhesive member.

12. The mounting structure as in claim 11, wherein:
the adhesive member is an adhesive tape.

13. The mounting structure as in claim 1, wherein:
the masking member includes a corner portion extending inwardly from the outer portion for covering a boundary between the through-hole and the ultrasonic sensor at the outer surface of the mounting member.

14. The mounting structure as in claim 1, wherein:
the vibrating front surface of the ultrasonic sensor is positioned to be flush with a front surface of the masking member covering the front periphery of the through-hole.

15. The mounting structure as in claim 1, wherein:
a front surface of the masking member covering the front periphery of the through-hole is colored with the same color as the vibrating front surface of the ultrasonic sensor.

16. The mounting structure as in claim 1, wherein:
the masking member is colored with the same color as the mounting member.

17. The mounting structure as in claim 1, wherein:
the mounting member is a bumper of an automotive vehicle.

* * * * *